Sept. 19, 1967     C. W. SIDWELL     3,342,468
APPARATUS FOR REMOVING COLD SKID MARKS FROM OBJECTS
Filed June 30, 1964     3 Sheets-Sheet 1
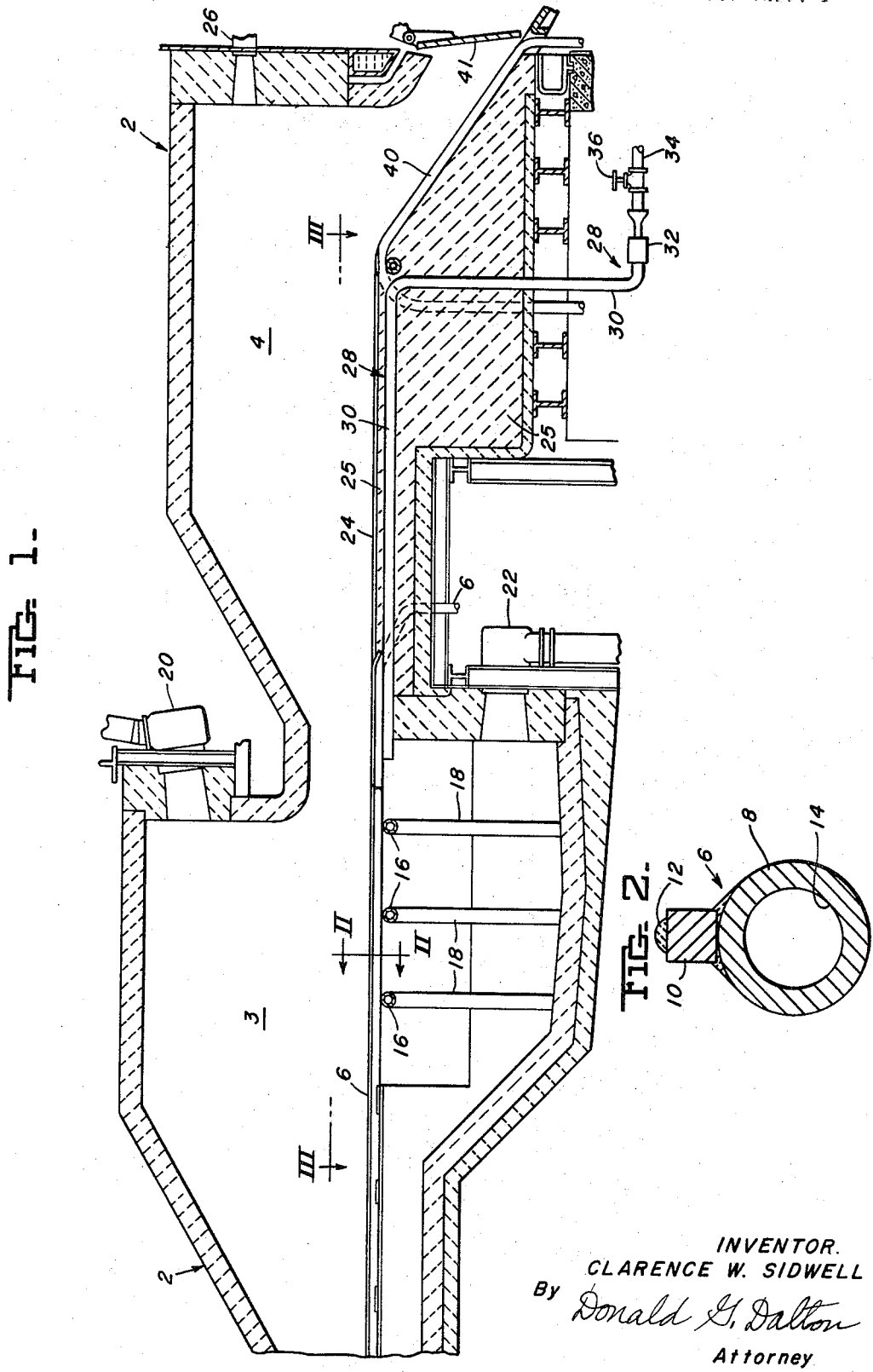
INVENTOR.
CLARENCE W. SIDWELL
By Donald G. Dalton
Attorney Sept. 19, 1967　　　C. W. SIDWELL　　　3,342,468
APPARATUS FOR REMOVING COLD SKID MARKS FROM OBJECTS
Filed June 30, 1964　　　　　　　　　3 Sheets-Sheet 2

INVENTOR.
CLARENCE W. SIDWELL
By Donald G. Dalton
Attorney

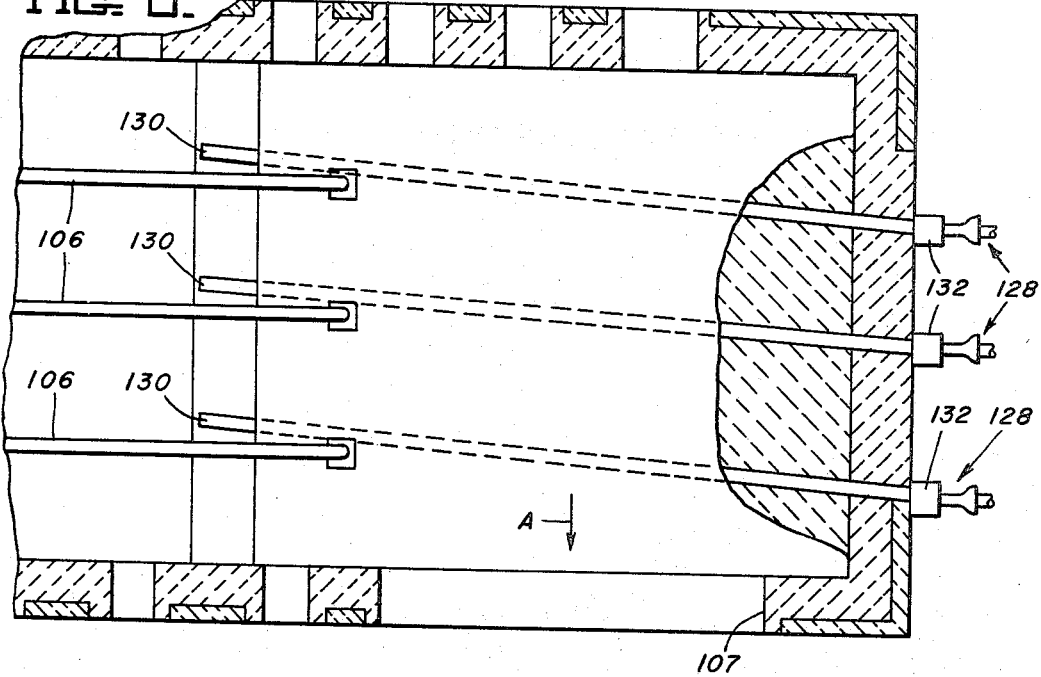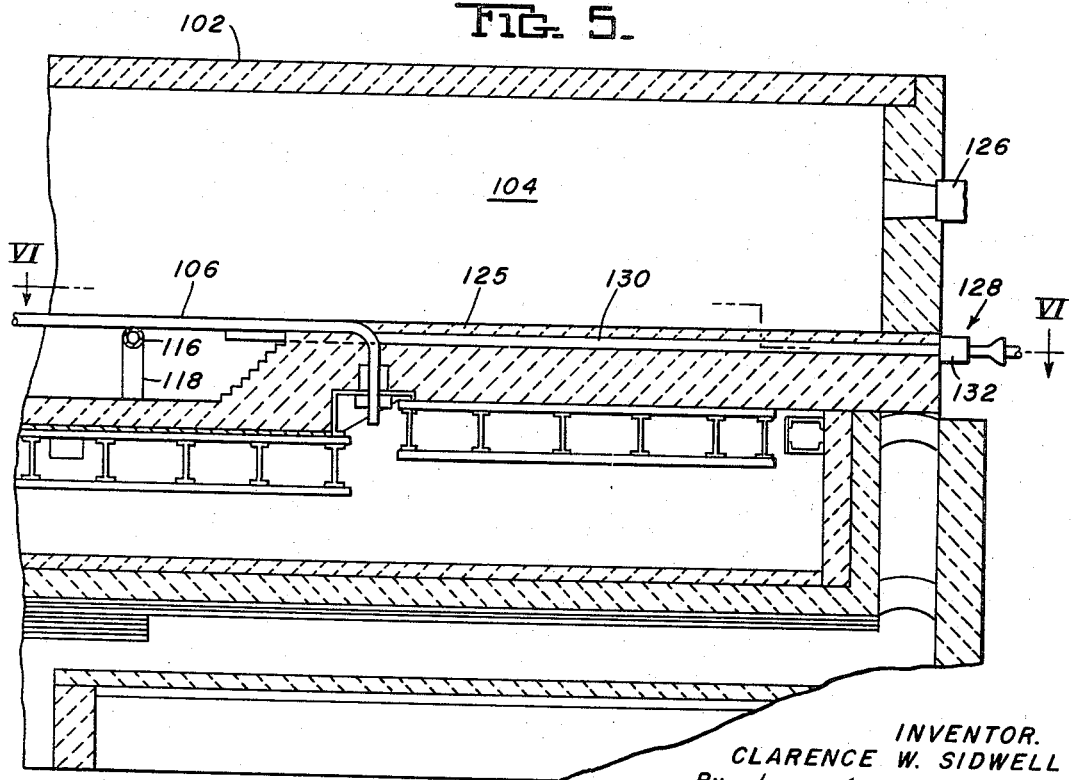

United States Patent Office 3,342,468
Patented Sept. 19, 1967

3,342,468
APPARATUS FOR REMOVING COLD SKID
MARKS FROM OBJECTS
Clarence W. Sidwell, Rich Township, Cook County, Ill., assignor to United States Steel Corporation, a corporation of Delaware
Filed June 30, 1964, Ser. No. 379,185
6 Claims. (Cl. 263—6)

This invention relates to furnaces for reheating steel objects, and particularly to the kind used to reheat semi-finished objects such as steel slabs and billets, immediately prior to their being subjected to further finishing operations. More specifically, the invention relates to an apparatus for removing the cold skid marks that are formed on the objects while they are being heated in these furnaces.

Most reheating furnaces have two or more heating zones in which steel objects are heated until a required surface temperature is reached, and a soaking zone where the objects are heated to a substantially uniform temperature throughout. in the heating zones, the objects are heated from both the top and the bottom by gas burners. They are pushed through on skids that are water-cooled to protect them from the intense heat flowing upward from the bottom gas burners. By so cooling these skids, their strength is maintained, and proper support of the steel objects is assured. However, in heating objects on these water-cooled skids, cold skid marks develop on those portions of the bottom surfaces of the objects that are in contact with the skids. These skid marks must be removed, since if allowed to remain, they will cause uneven rolling of the objects during the finishing operations.

The common way of removing such cold skid marks has been simply to heat the objects from the top while they are resting on dry skids in the furnace soaking zone, until the skid marks on the bottoms of the objects disappear. This has been found to be an inefficient and time-consuming way of eliminating the cold skid marks. While the length of time required to equalize the temperature of the central core of an object with its surface temperature is comparatively short, it takes much longer for the heat to penetrate from the top surface to the skid marks on the bottom of the object. Thus, to remove the skid marks from objects in this manner, the rate of travel of the objects through the soaking zone must be slowed down, thereby lowering the rate at which reheated objects can be produced by a particular furnace of a given size.

It is an object of my invention to provide a means of removing cold skid marks on the bottoms of steel objects more quickly than by the foregoing conventional means, so that these objects may be moved through the reheating furnace at a faster rate.

It is a further object of my invention to provide apparatus in a reheating furnace that will remove quickly the cold skid marks on the bottoms of objects passing through the furnace.

The attainment of these and other objects will appear more readily from the following detailed description of preferred embodiments of my invention, shown in the attached drawings in which:

FIGURE 1 is a longitudinal section of the soaking zone and one of the heating zones of a furnace for reheating semi-finished steel objects;

FIGURE 2 is an enlarged cross-section taken on the line II—II of FIGURE 1;

FIGURE 5 is a longitudinal section of the soaking zone of another type of furnace for reheating semi-finished steel objects; and FIGURE 6 is a horizontal section of the furnace of FIGURE 5 taken on line VI—VI of FIGURE 5.

Figure 3:
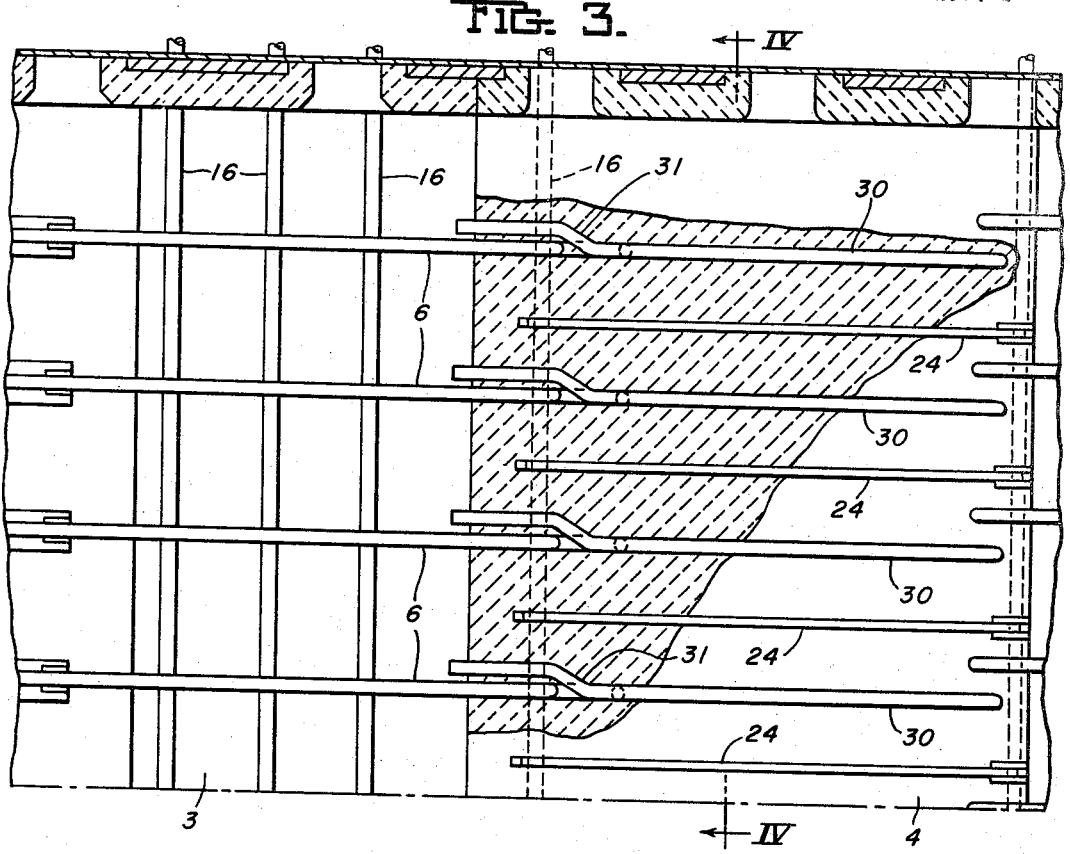
FIGURE 3 is a horizontal section of the furnace of FIGURE 1, taken on line III—III of FIGURE 1.

In FIGURE 1, reheating furnace 2 has a final heating zone 3 and a soaking zone 4. Steel slabs or other semi-finished steel objects are pushed into the heating zone 3 from the left on water-cooled skids 6. As best shown in FIGURE 2, each skid 6 includes a round pipe 8, a rectangular rod 10 welded to the top of pipe 8, and an abrasive resistant bead 12 extending along the top surface of rod 10. Cooling water flows through the central opening 14 in pipe 8 to protect the skid from being weakened by the intense heat generated beneath the steel objects. The skids 6 are supported by cross pipes 16 and pipe supports 18 (FIGURE 1), which are also water-cooled.

While being pushed through the heating zone 3 on skids 6, the objects are heated both from the top and from underneath by gas burners 20 and 22 respectively. In the case of a steel slab reheating furnace, the slabs are heated by these heating zone burners to surface temperatures of approximately 2300° F. and center temperatures of about 2250° F. However, due to their contact with the beads 12 on the water-cooled skids 6, the bottom surfaces of the slabs are left with cold skid marks having temperatures that are considerably lower than the temperatures of the other surface portions of the slabs.

Figure 4:
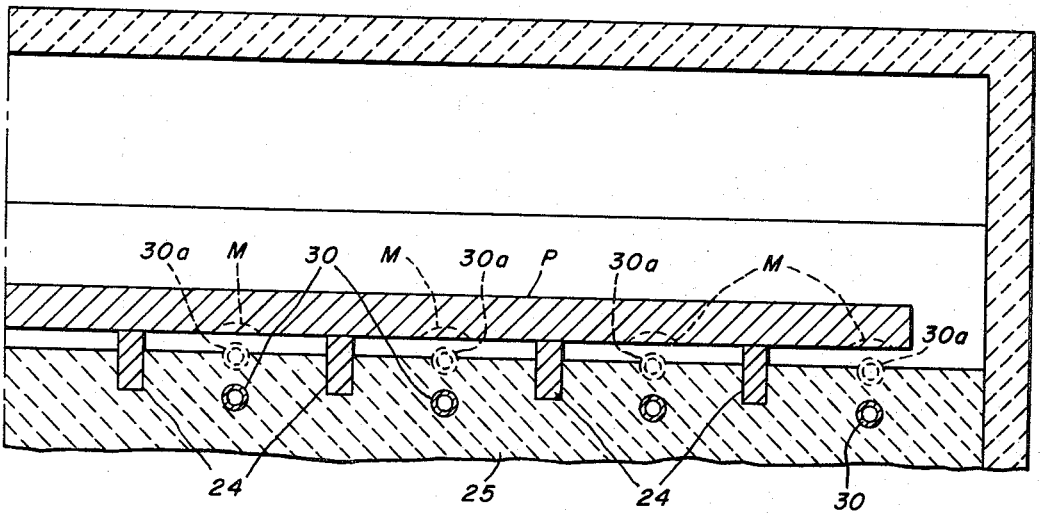
FIGURE 4 is an enlarged sectional view of the soaking zone of the furnace of FIGURES 1 and 3, taken on line IV—IV of FIGURE 3.

As the objects pass into the soaking zone 4, they are transferred onto stainless steel dry skids 24. As seen in FIGURE 4, dry skids 24 are partially embedded in a brick hearth 25. Although these skids are subjected to the intense heat of the objects traveling thereon, they do not receive any direct heat from a bottom burner as do the skids 6 in the heating zones, and hence the skids 24 do not have to be water-cooled.

The function of soaking zone 4 is to make the temperatures of the steel objects substantially uniform throughout. This has been done in the past solely by a top gas burner 26 (FIGURE 1), but heating the cold skid marks on the bottoms of the objects in this manner has been time-consuming and has required a long hearth in the soaking zone. It would not do to shorten the heating time by placing a bottom gas burner in the soaking zone, similar to the burner 22 in heating zone 3, since the dry skids 24 would not withstand the heat produced by such a burner.

In order to provide a more direct source of heat for the bottom skid marks on the objects, without raising the temperature of the dry skids 24 too high, the furnace 2 is provided with radiant tube burners 28 (FIGURE 1), each of which includes a "Carborundum" radiant tube 30 and a burner 32. As seen in FIGURE 3, the dry skids 24 in soaking zone 4 are offset from the water-cooled skids 6 in heating zone 3. This permits the radiant tubes 30 to be aligned with the water-cooled skids 6 so that the skid marks produced on the steel objects while traveling upon the skids 6 will pass directly over and be heated by radiant tubes 30. In order to avoid interference with the water-cooled skids 6, tubes 30 are provided with slight bends 31 which offset their ends adjacent the skids 6.

The tubes 30 are embedded in the brick hearth 25 and are placed so as to provide localized heat radiation to skid marks M on an object P supported on the skids 24 (FIGURE 4). These tubes may be either completely embedded in the hearth 25 as shown by tubes 30 in FIGURE 4, or only partially embedded in the hearth, as illustrated by tubes 30a in dotted lines in FIGURE 4. With partially embedded tubes 30a, the skids 24 must be high enough so as to support the steel objects above the tops of the tubes, with allowance made for the wearing down of the skids 24. Also, the hearth must be checked at intervals to insure that the steel objects are not in danger of coming into contact with the radiant tubes 30a. It is therefore preferred that these radiant tubes be completely embedded with their tops 3 to 4 inches below the hearth surface, as are tubes 30 (FIGURE 4). While heat losses will occur in the transmission of heat from the tubes through the 3 to 4 inch refractory layer, the losses will not be substantial and will require only a slightly longer time for the steel objects to remain in the soaking zone in order to remove the cold skid marks. The time saving over the soaking process without the use of radiant tubes will be nearly the same whether the tubes are partially or fully embedded.

At the object discharge end of the soaking zone (FIGURE 1), each radiant tube 30 has a right-angle bend from where it extends downward through the brick hearth 25 to a room below the soaking zone. In this room, each tube 30 is connected to a burner 32, which is fed by a gas line or gas and air line 34 having a shut-off valve 36. As shown in FIGURE 3, the other end of tube 30 is open, causing the hot gases therein to discharge into the heating zone 3 where the steel objects are being pushed off of the water-cooled skids 6. The discharge of hot gases at this location has the advantage of providing intense heat adjacent the skid marks of the objects before they enter the soaking zone 4, thereby preheating the skid marks and making easier their removal when they reach the soaking zone. However if for any reason a discharge of hot gases into the heating zone 3 is not desired, then the discharge ends of the tubes 30 may be connected to a duct, not shown, leading through the furnace wall to the outside.

When the radiant tube burners 28 are in operation, the burners 32 are controlled to maintain the horizontal portions of tubes 30 underneath the cold skid marks at approximately 2400° F. After the skid marks are eliminated by the radiant heat from these tubes, and the objects have been heated to a substantially uniform temperature throughout, they slide down discharge skids 40 and out furnace door 41 (FIGURE 1).

FIGURES 5 and 6 show another embodiment of my invention, for use with a furnace of a slightly different design. Furnace 102 provides a side discharge for the steel objects traveling therethrough, rather than an end discharge as in the furnace of FIGURE 1 Furnace 102 has a soaking zone 104 (FIGURE 5) similar to the soaking zone 4 of furnace 2 of FIGURE 1. Objects enter the soaking zone 104 on water cooled skids 106. After being heated in the soaking zone to a substantially uniform temperature throughout, the objects are then pushed in the direction of arrow A (FIGURE 6) out a side discharge opening 107. There are no dry skids in the soaking zone 104, and objects are slid through this zone directly upon the top of a brick hearth 125 (FIGURE 5).

Objects are heated from the top in soaking zone 104 by a burner 126, and the cold skid marks on the bottoms of the objects are removed by radiant tube burners 128. Each radiant tube burner 128 includes a carborundum radiant tube 130 and a burner 132. Since the furnace 102 has a side discharge rather than an end discharge, the radiant tubes 130 are made straight, and extend through end wall 134 of furnace 102. The burners 132 are connected to the tubes 130 outside this furnace wall.

The radiant tubes 130 must be embedded entirely below the surface of the brick hearth 125, since they cannot come into direct contact with the steel objects supported on the top of the hearth. The tubes 130 are placed in substantial alignment with the water cooled skids 106 of heating zone 103. They may be set at a slight angle to the water cooled skids as shown in FIGURE 6, so that their discharge ends will not interfere with the skids, or they may be set parallel to the skids 106 and provided with slight bends similar to the bends 31 in tubes 30 of FIGURE 3.

The effect which the radiant tube burners described hereinabove will have on the time required to eliminate the bottom skid marks on steel objects will vary with the size and shape of the particular objects heated. However, most objects should require from one-third to one-half less time in a soaking zone having radiant tubes installed than has heretofore been experienced in soaking zones without such tubes. This will enable new reheating furnaces to be built with shorter soaking zones, and the capacity of the older furnaces may be increased by speeding up the rate of travel of the objects through the soaking zones after radiant tube burners are installed therein.

While several embodiments of my invention have been shown and described it will be apparent that other adaptations and modifications may be made without departing from the scope of the following claims.

I claim:
1. In a furnace for reheating objects having a heating zone and a soaking zone, said heating zone having an opening at one end for introducing said objects thereinto and an opening at its other end communicating with said soaking zone, said heating zone being provided with parallel water-cooled skids extending between said openings for supporting said objects in sliding engagement therewith while said objects are heated so as to produce cold skid marks in the bottom surfaces of said objects, and said soaking zone having a refractory hearth, the improvement comprising dry skids in said soaking zone generally parallel to and offset from said water-cooled skids, radiant tubes composed of a high-strength, heat conducting material, said radiant tubes being at least partially embedded in said refractory hearth between and below the tops of said dry skids and substantially aligned with said water-cooled skids, and means for directing hot gases through said tubes so as to direct localized heat to the said cold skid marks of said objects passing thereover.

2. The combination of claim 1 including means for introducing hot gases into said radiant tubes at the ends of the tubes furthest from said heating zone of the furnace, said radiant tubes having their ends nearest said heating zone open so that said hot gases discharge into said heating zone.

3. In a furnace for reheating objects having a heating zone and a soaking zone, said heating zone having an opening at one end for introducing said objects thereinto and an opening at its other end communicating with said soaking zone, and said soaking zone having a refractory hearth, the combination comprising water-cooled skids extending through said heating zone for supporting said objects and having sliding engagement with portions of the bottom surfaces of said objects, means for heating said objects while supported on said water-cooled skids, dry skids in said soaking zone generally parallel to and offset from said water-cooled skids, radiant tubes composed of a high-strength, heat conducting material, said radiant tubes being at least partially embedded in said refractory hearth between and below the tops of said dry skids and substantially aligned with said water-cooled skids, and means for directing hot gases through said tubes so as to direct localized heat to the said portions of said objects engaged by said water-cooled skids.

4. The combination of claim 3 including means for introducing hot gases into said radiant tubes at the ends of the tubes furthest from said heating zone of the furnace, said radiant tubes having their ends nearest said heating zone open so that said hot gases discharge into said heating zone.

5. In a furnace for reheating objects having a heating zone and a soaking zone, said heating zone having an opening at one end for introducing said objects thereinto and an opening at its other end communicating with said soaking zone, the combination comprising water-cooled skids extending through said heating zone for supporting said objects and having sliding engagement with portions of the bottom surfaces of said objects, means for heating said objects while supported on said water-cooled skids, a refractory hearth in said soaking zone, radiant tubes composed of a high-strength, heat conducting material, said radiant tubes being fully embedded beneath the top surface of said hearth and substantially aligned with said water-cooled skids, and means for directing hot gases through said tubes so as to direct localized heat to the said portions of said objects engaged by said water-cooled skids.

6. The combination of claim 5 in which said radiant tubes are heated by hot gases flowing therethrough, and said tubes have their ends at which said gases are discharged located adjacent said water-cooled skids so as to heat the bottoms of said objects prior to their removal from said water-cooled skids.

References Cited

UNITED STATES PATENTS

| | | | |
|---|---|---|---|
| 1,380,102 | 5/1921 | Horn | 263—6 |
| 1,912,933 | 6/1933 | Culbertson | 263—6 |
| 2,180,089 | 11/1939 | McDermott | 263—6 |
| 3,081,073 | 3/1963 | Conway | 263—6 |
| 3,100,811 | 8/1963 | Bloom | 263—6 |
| 3,179,395 | 4/1965 | Esler | 263—6 |
| 3,258,255 | 6/1966 | Tippmann | 263—6 |

FOREIGN PATENTS 1,314,954  12/1962  France.

FREDERICK L. MATTESON, JR., *Primary Examiner.*
JOHN J. CAMBY, *Examiner.*